United States Patent [19]

Atencio

[11] 4,326,819
[45] Apr. 27, 1982

[54] FUNCTIONALLY TRANSFORMABLE HYDROSTATION

[76] Inventor: Francisco J. G. Atencio, Estafeta Dr. Garcia, 3101 Diamante Entre Rios, Argentina

[21] Appl. No.: 95,351

[22] Filed: Nov. 19, 1979

[51] Int. Cl.³ .............................................. E02B 9/08
[52] U.S. Cl. ........................................ 405/78; 290/53; 405/75
[58] Field of Search ...................... 405/75, 76, 78, 77; 290/52–54, 59, 42, 43

[56] References Cited

U.S. PATENT DOCUMENTS

| | | | |
|---|---|---|---|
| 2,163,102 | 6/1939 | Odill | 405/78 |
| 4,279,539 | 7/1981 | Atencio | 405/78 |

FOREIGN PATENT DOCUMENTS 1002693  2/1957  Fed. Rep. of Germany ........ 405/75

Primary Examiner—Dennis L. Taylor
Attorney, Agent, or Firm—Emory L. Groff, Jr.

[57] ABSTRACT

A hydrostation installation includes a dam body with a fluid flow conduit therethrough cooperating with a displaceable hydromotive set provided with a conduit containing a generator set therein. A separate, gated assembly is insertable intermediate the dam body and hydromotive set to complete a fluid flow path through the hydromotive set, gated assembly and dam body. In use, the hydromotive set and gated assembly may be attached to one another to form a hydromotive assembly and upon release of this attachment, the gated assembly and/or hydromotive set may be independently removed from the installation.

8 Claims, 2 Drawing Figures

FUNCTIONALLY TRANSFORMABLE HYDROSTATION

The present invention relates to dams having hydroelectric stations associated with river watersheds for purposes of energy generation, navigation development, flood control and storage for fluid flow stages, development of irrigation facilities and the like as found in plain alluvial river watershed areas.

These dams are provided with functionally transformable hydroelectric stations which may be designed to operate in a powered electric generation mode or alternatively, transformed into a fluid flow relief operation mode and are intended to operate mostly at low hydraulic heads.

Hydroelectric assemblies engineered for purposes of electric energy production are, of course, well known in the art. The aim of these hydroelectric assemblies positioned in combination with the fluid flow passages extending through the bodies of the involved dams, is to provide for the conversion into electric energy of the inherent gravitational energy stored in the mass of fluid retained in the reservoirs located behind or upstream of the dams.

It is an aim of the present invention to provide an improved hydrostation installation which may be employed at projected hydroelectric plants in those plain alluvial rivers not being hydroenergetically developed at the present time, but which have a good potential for hydroelectric power production.

By means of the functionally transformable hydrostation concept, the cumbersome and expensive task of erecting fluid flood flow spilling means to allow for the passage of excess fluid discharges, is reduced and simplified thereby decreasing the time schedule to build the concrete structures of a dam and to erect the hydroelectric equipment components required to be respectively installed. This is because the functionally transformable hydrostation concept provides a new arrangement by means of which flood flows are partly and alternatively passed through the conduits formerly utilized for hydropower production purposes. This function is identified as the relief operation mode and serves to maintain a maximum permissible head-water level during high water periods and also for the evacuation of flood waters in castastrophic cases.

In most circumstances, it is necessary to be able to maintain this operation mode over a period of several days and the relief flood flows are passed through the turbine runners while running in an idle status. Thus, the runners must be constructed of a solid, rugged mechanical design which is realized by directly connecting the turbine runner to the generator's rotor with a single axis body of reinforced, solid design.

With the present invention, a satisfactory vibration-free and cavitation-free running performance during the above flood condition is achieved by throttling the hydraulic head and greatly increasing back pressure at the turbine by means of a separate gated assembly having gate means which is lowered or closed in the assembly's conduit portion downstreamly of the turbine runner location.

Until now, in actual practice, the fluid flow discharges in the large stages of a river have been regulated by several weir-gated sections having movable flood controlling gates. The requirement exists that within one or two minutes after an emergency shutdown of the turbines, the entire river flow can be diverted to the weir and spilling sections so as to avoid suction waves and surge phenomena upstream of the dam and this requirement results in severe conditions for the opening amplitudes and opening operating times of such spillway weir closing devices.

To cope with this deterring requirement, the logical approach is to use the turbine fluid flow passageway for dealing also with a portion of the relief fluid flow discharge and when operating under idling running conditions with the generators suddenly disconnected from the electrical grid and their respective turbine runners.

To achieve the above, the proposed quick-acting gated assembly is provided adjacent to and as part of the diffuser tube or draft tube conduit for throttling the fluid flow discharge passing through the turbine runner, therefore reducing the hydraulic head and simultaneously increasing the back pressure on the turbine runner, all by means of partly closing a gate of the gated assembly. In this manner, the turbine runner will be able to run under relief operation mode conditions at, say 50% or 60% of the designed fluid flow rate without significant hydrodynamic disturbances due to transient phenomena, with this operation being possible over a long period of time.

Thus, a functional transformation of the operative mode is readily obtained by means of a simpler design in the hydroelectric station project.

This simplified arrangement is an aim of the present invention and is realized by means of hydromotive set components which are assembled at a factory and incorporated at the respective dam's fluidic flow conduits after being tansported to the dam site. In this way, the cumbersome and expensive task of erecting hydromotive machines in the machine halls, all by means of difficult to erect cranage facilities and with timely expensive procedures, is fully avoided. Also, the machine hall concept designed at the toe of the structural body of a dam is avoided too, thus reducing the time schedule required to build the concrete structure of a dam.

Another aim of the present invention includes providing a hydromotive station resulting in improved maintenance procedures. Those machines which require overhaul are instantly shifted away from the dam body and replaced by operative ones arriving from a service center. In this manner, a unique service station may be provided for the maintenance of a plurality of functionally transformable hydrostations.

According to one aspect of the present invention, there is provided a functionally transformable hydromotive assembly for either an energy generation purpose or alternatively a relief operation mode purpose with the assembly being designed to be fitted against the fluid flow conveying means defined through the structural body of a dam and in coincidence with the respective gated water passages.

When the hydromotive assembly is removed from the dam, then it can be divided or separated in two components, one comprising the gated assembly juxtaposed the dam body and the other component comprising the hydromotive set containing the turbine generator set or electric generating unit and which is removed for maintenance. This procedure avoids the task of closing the fluid flow directing conduit with respective independent closure means.

The functionally transformable hydromotive set has incorporated therein a fluid flow directing conduit engineered into its structural body and defined by a lateral wall surrounding at least one member-component of the turbine generator set. This conduit includes a first open end for fluid flow admission and a second open end for discharging actuating fluid flows entering the first open end. This hydromotive set as stated, may be joined to the gated assembly at the downstream end of the turbine's conduit which gated assembly may optionally serve as an independent structural body.

The gated assembly includes a gate or closure device and the necessary equipment for the operational performance of the gate closure such as motive servomotors or remotely actuated controls as well as sealing means and slots for allowing displacement of the gate. The actuated gate itself may comprise either a butterfly gate or a sliding plain gate.

Optionally, it will be understood that the functionally transformable hydromotive assembly may comprise the separable components, namely the hydromotive set including the turbine generator set and the remaining component including the gated assembly. This arrangement permits a simpler maintenance procedure as already explained and avoids the closure of the fluid flow passageway conduit of the main dam body, in view of the independent closure means provided by the gated assembly.

The functionally transformable components may be delivered by special transportation means such as: LASH ships, specially designed barges, flotatable pontoons, transportable and partly sinkable pontoons, and the like. In this manner, the components arrive at the foot of the dam and are instantly placed into position for operation as a functionally transformable source means at the respective dam's fluid flow directing conduit.

The above defined objective is achieved due to the functionally transformable hydrostation concept and because of the very compact and strong mechanical design of the assemblies.

Auxiliary means may also be employed for producing the required movable pattern for purposes of installing and removing these assemblies at or from the structural body of the respective dam. These means may include cranage arrangements, flotatable and sinkable pontoons, jacking mechanisms and the like as is well known in the art.

DESCRIPTION OF THE DRAWINGS

FIG. 1 comprises a longitudinal horizontal section taken along the line B—B of FIG. 2 while FIG. 2 is a longitudinal vertical section taken along the line A—A of FIG. 1 Both views are depicted through the center-line of the respective fluid flow passageways of the aligned hydromotive assembly and dam body.

Figure 1:
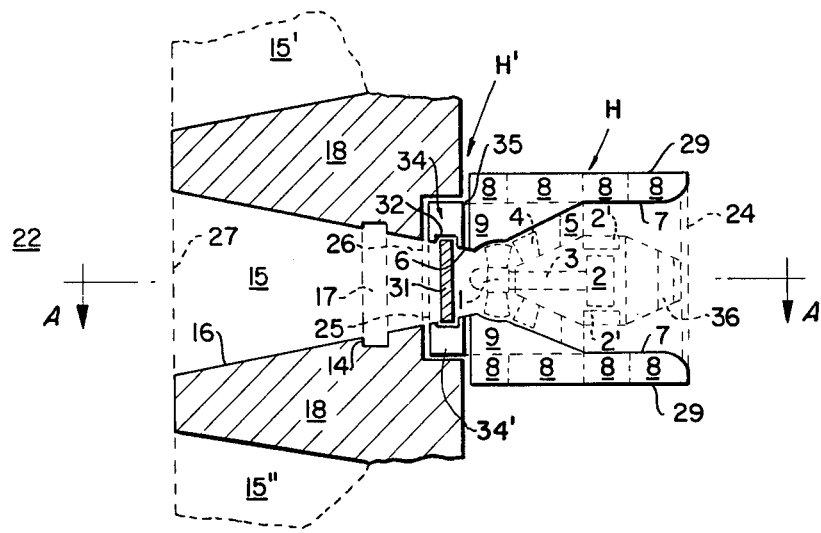
FIGS. 1 and 2 illustrate a dam with a functionally transformable hydromotive assembly according to the present invention.
Figure 2:
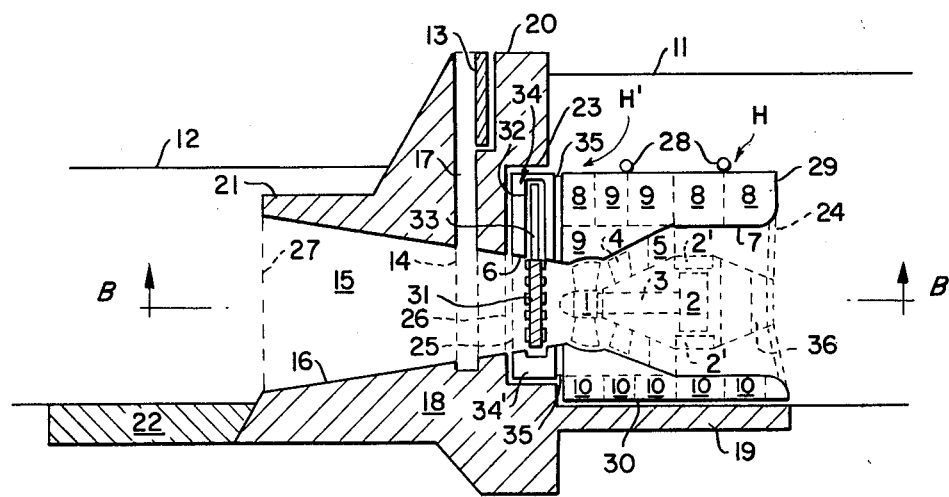

Each functionally transformable assembly which may be one of a plurality of such machines fitted at the body of the dam, includes a capsul-mounted generator having a horizontal-axis Kaplan (alternatively propeller) turbine runner directly connected to the generator's rotor to form only one rotating body-component, as shown most clearly in FIGS. 1 and 2. This particular generation set involves a conventional arrangement already available in known technology such as exemplified in U.S. Pat. No. 4,078,388 dated Mar. 14, 1978.

Optionally, a Harza type turbine-generator design could be adopted, with the generator's rotor connected to the periphery of the turbine runner and located externally of the fluid flow conveying conduit. This more compact arrangement is not shown in the respective FIGS. 1 and 2.

From these two figures of the drawing, the simplicity of the engineered design is clearly shown wherein, the fluid flow passageway or conduit is a simple, substantially venturi-like horizontal tube that is rectilinearly aligned along the fluid flow circulation path. This kind of design permits a structural foundation arrangement that is essentially a single concrete slab, while the total concrete volume required is much smaller than for a vertical-axis conventional hydroelectric assembly wherein water passages must be large enough to accommodate the complex array of intakes, scrolls, bends, diffusers and the like. The present design instead, avoids the deep excavation and massive concrete structures as required for conventional elbow draft tube or diffusers.

As shown in the drawings, the functional transformable hydroelectric assembly concept may include a plurality of hydromotive sets H, each provided with a motive turbine runner 1 directly joined to an electric generator rotor 2 in a very rigid and solid engineered manner by means of the intermediate connecting shaft 3.

A movable wicket gate distributor 4 and a fixed distributor 5 are included as is well known in the art, together with the generator's stator 2' and an enclosing hermetic capsule 36 which completes the generator set.

The hermetic capsule 36 surrounding the electric generator's rotor 2 and stator 2' form an electric generation unit or set of the unitary hydromotive set H.

A peripheral and lateral wall 7 completely encircling the electric set defines an intake open end 24 of a conduit 7' forming a fluid flow circulation path or passageway as shown in FIGS. 1 and 2 and which fully projects through the longitudinal extent of the hydromotive set H.

Associated with the exterior of the lateral wall 7 are a plurality of chambers 8 for the storage of spare parts and miscellaneous utilization, chambers 9 serving to provide spacing for machine halls and chambers 10 for fluid storage purposes, such as water, oil and the like.

Access means, not shown, are designed to lead to the machine hall 9 and to the capsule 36.

Suitable structural means 35 are included for fastening and securing the external wall of the hydromotive set body 29 to the gated assembly 34 when being employed in the use position as shown in the drawing figures. In this joined relationship, the hydromotive set H and gated assembly 34 are combined to form the hydromotive assembly H'.

One end portion 6 of the conduit 7', when the components are joined as the hydromotive assembly H', combines with the dam main body 18 to provide fluid flow conveying means including the dam passageway 15. The end portion 6 belongs to the downstream portion of the conduit 7', that is, downstreamly of the turbine runner 1 position and is flared as a diffuser tube, serving as a draft tube.

Cooperating with the dam fluid flow conduit 15 is a diffuser peripheral wall 16 having a first open end 26 for admission of fluid flow coming from the hydromotive assembly exhausting open end 25 and a second open end 27 for fluid flow exhausting from the entire installation. The wall 16 will be seen to define a flared conduit 15 through the body 18 of the dam which latter includes extensions 21 on the dowstream face thereof.

Emergency and spare closure means 13 are included in the dam body within a vertical passage 17 and adapted to be conveyed along and within slots 14 by means of cranage facilities, not shown. By this closure means 13, it is possible to close the conduit 15 when both the gated assembly 34 and hydromotive set H of the hydromotive assembly H' have been removed from the dam for maintenance purposes.

The functionally transformable hydromotive set H is provided with a bottom supporting wall 30 as shown in FIG. 2.

The removable gate means of the invention comprising the gated assembly 34 includes a housing 34' containing a shiftable closure or gate 31 adapted to alternately open and close the fluid conduit or diffuser tube 15 through the gated assembly housing 34' to provide the functional transformation as will be described hereinafter.

The main dam structural body 18 includes an appropriate crested area 20 over which the upstream water level can temporarily overflow in floods while the hydromotive assembly H' includes auxiliary jacking means (not shown) for assisting in the horizontal displacement thereof towards and away from the main dam body 18. The upstream water level is depicted by the line 11 and the downstream water level by the line 12 in FIG. 2. The open end of the lateral wall 7 of the conduit 7' encircling the generating set capsule 36 is represented by the first open end 24 while the opposite open end of the hydromotive assembly H' defining a draft tube is represented by the second open end 25.

The main structural body 18 of the dam includes a downstreamly positioned slab 22 located beneath the sectorial conduit diffuser arrangement 15 while the functionally transformable hydromotive set H is intended to be adequately supported by engagement of its bottom wall 30 upon the supporting slab 19. The structural body 18 of the dam cooperates with the lateral structural concrete walls 23 accommodating the hydromotive assembly's gated assembly 34.

The passage of motive fluid flows and of flood fluid flows from the upstream to the downstream area may be controlled by means of the gate 31 displaceable within the vertical slots 32 in the housing 34' and which are actuated by a servomotor 33, all embodied within the housing 34' of the gated assembly 34 and becoming part of the hydromotive assembly H' when integrated with the hydromotive set H. Alternatively, the gated assembly 34 may serve to seal, partly or fully, the continuity between the conduits of the set H and assembly 34 and the fluid flow path defined through the dam as defined by the diffuser conduit 15.

The transformation of the functional performance is normally realized when the generator is suddenly disengaged from the electrical network because of an unexpected faulty situation. By this transformation, the turbine runner 1 is passed from a motive operational status to an idle one without power production, while a fluid flow continues to pass therethrough thus, avoiding the full utilization of alternative means such as spilling weirs, which can not be actuated instantaneously. This avoids undesirable hydrodynamic disturbances on the water body located in the upstream portion of the dam such as waves, surges, oscillations of the lake water level and the like.

Thus, the hydroelectric set has been functionally transformed and thereafter runs in a relief operation mode. In this transformed mode the turbine and the connected generator runs idle and without major undesirable effects. A back pressure effect is introduced in the rear area of the turbine runner in order to stress-relieve the dynamic performance thereof.

When electric service is again restored, then the electrical generator is synchronized once again to the network and the gate 31 is raised within the slots 32 to again functionally transform the status of the hydromotive set H which resumes generating electric power.

The same procedure is followed when a river flood condition is achieved, which reduces the available hydraulic head to a point at which it is not technically possible to operate the hydraulic turbine. In such instances, the functional transformation mode allows utilization of the dam's engineered conduits in order to pass part of the flood flows thereby, stress-relieving the duty performed by the spillway weir-gated means of the dam. Once the flood has receded, the flood flow relief operation is transformed once again into an energetic operation mode and the hydroelectric set continues with the task of producing electric power.

Appropriate cranage means atop the dam main body crest 20 are optionally provided for manipulation of the emergency closure means or gate 13, which gate is suitably disposed for vertical displacement within the slot 17 and along supporting rails 14 for closure of the conduit 15. This closing permits the removal of both the hydromotive set H and the gated assembly 34 away from the dam body 18 for maintenance procedures.

The same cranage means for manipulating the dam body gate 13 could be used to engage the hoops 28 of the hydromotive set H so as to remove it from juxtaposed the dam body.

Other engineered dispositions for performing these duties could be considered following the teachings of U.S. Pat. No. 4,143,990, issued Mar. 13, 1979.

From the above, it will be understood that the disclosed hydromotive assemblies H' may be engineered in individual assemblies having only one hydroelectric machine or, alternatively in a plurality of such assemblies respectively positioned in functional coincidence with additional adjacent dam conduits 15',15" etc.

It will be understood that improvements may be introduced in the embodiments previously described by way of example without departing from the scope of the invention as specifically defined in the following claims.

I claim:

1. A fluid storing installation including, a main dam body having a fluid flow conduit therethrough provided with opposite open ends, at least one hydromotive assembly juxtaposed said dam body adjacent one said open end of said conduit, said hydromotive assembly provided with a fluid flow conduit therethrough, said hydromotive assembly conduit substantially horizontally disposed and axially aligned with said dam body conduit, an energy generation unit having at least one component disposed within said hydromotive assembly conduit and adapted to be actuated by fluid flow therethrough, said generation unit including a generator directly connected to a turbine runner, said hydromotive assembly conduit having a first open end and an opposite second open end for discharging fluid flows entering said first open end, said hydromotive assembly including a gate within said hydromotive assembly conduit operable to controllably vary the volume of fluid flow discharging through said conduit second open end and means for displacing said hydromotive assembly towards and away from said dam conduit when said hydromotive assembly is respectively positioned at or removed from said dam body.

2. A fluid storing installation according to claim 1 wherein, said energy generation unit includes means controllably varying the energetic power output of said unit when actuated by fluid flows through said hydromotive assembly conduit.

3. A fluid storing installation according to claim 2 wherein, said one component of said energy generation unit includes a motive turbine of the axial flow type having a movable bladed runner.

4. A fluid storing installation according to claim 1 wherein said generator is contained within a horizontally disposed capsule within said hydromotive assembly conduit and said generator is combined with said turbine runner.

5. A fluid storing installation according to claim 1 wherein, said one component of said energy generation unit disposed within said hydromotive assembly conduit includes said turbine runner whereby, said gate positioned within said hydromotive assembly conduit is actuated to substantially increase back pressure at said turbine runner when said hydromotive assembly is functionally operated in a relief mode.

6. A fluid storing installation according to claim 1 wherein, said hydromotive assembly comprises a hydromotive set containing said energy generation unit and a separate gated assembly containing said gate, and said hydromotive set and gated assembly adapted to be connected together to form said hydromotive assembly.

7. A fluid storing installation according to claim 6 wherein, with said gated assembly connected to said hydromotive set said gated assembly is positioned adjacent said main dam body and said hydromotive set is positioned upstream and adjacent said gated assembly whereby, a smooth and streamlined passage of fluid flows is provided through the respectively combined hydromotive set, gated assembly and dam body fluid flow conduits when said downstreamly positioned gated assembly gate is fully opened.

8. A fluid storing installation according to claim 6 wherein, said gated assembly is structurally combined with said main dam body.

* * * * *